UNITED STATES PATENT OFFICE.

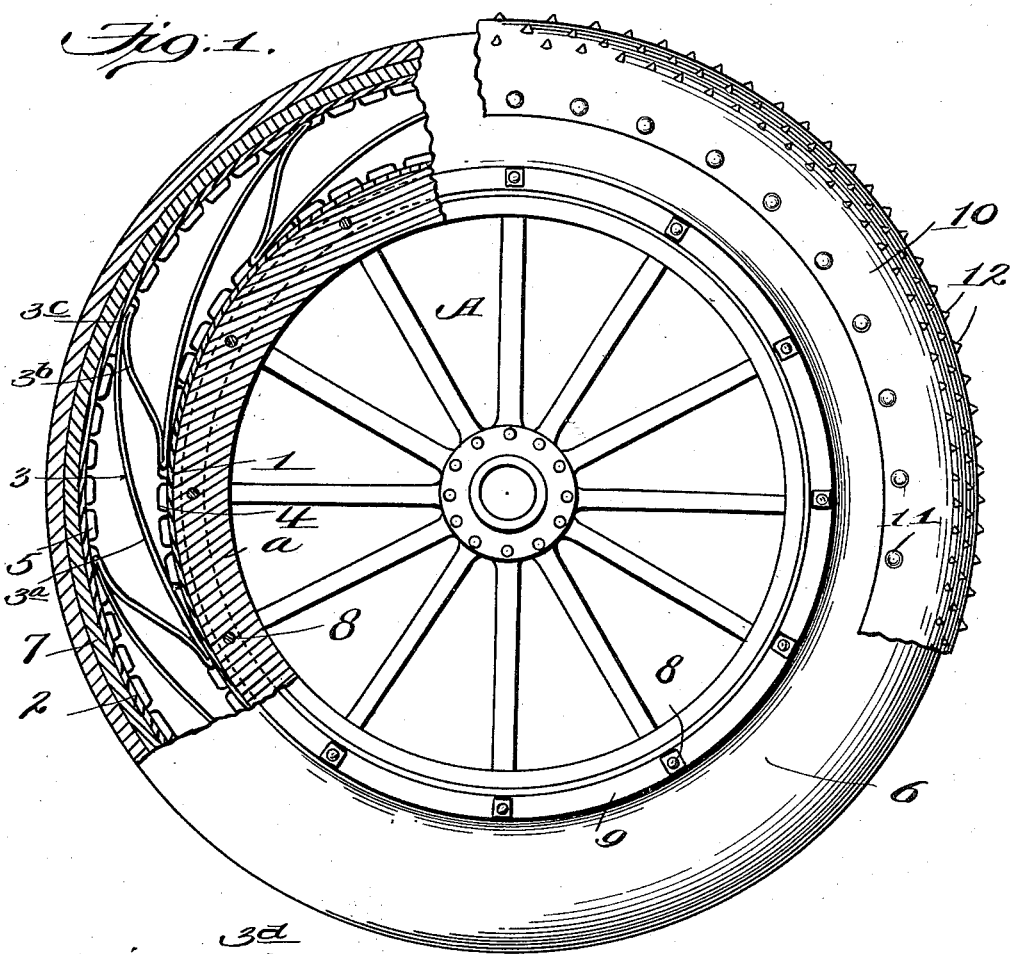
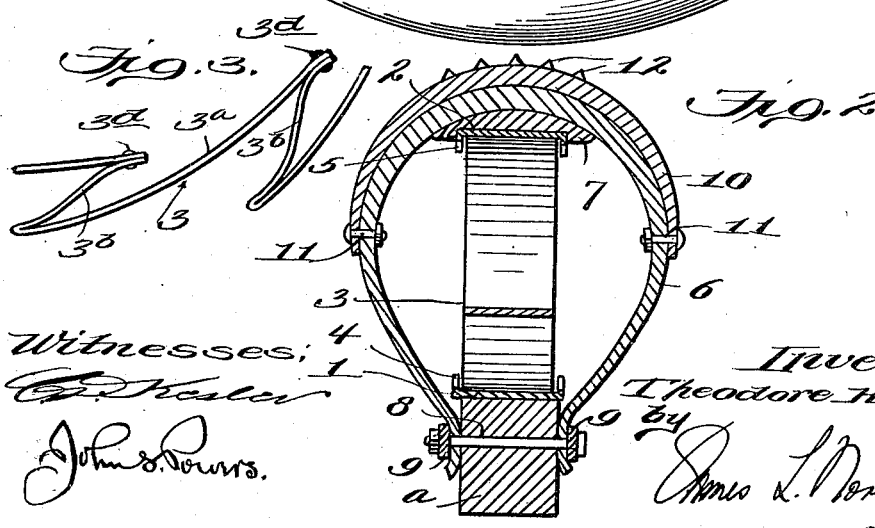

THEODORE H. BANKS, OF SAN ANTONIO, TEXAS.

VEHICLE-TIRE.

1,024,431.   Specification of Letters Patent.   Patented Apr. 23, 1912.

Application filed October 23, 1911. Serial No. 656,221.

*To all whom it may concern:*

Be it known that I, THEODORE H. BANKS, a citizen of the United States, residing at San Antonio, in the county of Bexar and State of Texas, have invented new and useful Improvements in Vehicle-Tires, of which the following is a specification.

This invention relates to improvements in vehicle tires, and it has more particular reference to a vehicle tire of that type which includes relatively shiftable inner and outer rims and a series of cushioning springs which are arranged between said rims, for the purpose of absorbing shocks and of providing for an easy running action.

The principal object of the present invention is to provide interposed springs which shall be superior to those now employed in tires of the general type referred to in points of strength, durability, lessened cost, and easy and efficient action.

The invention is illustrated in the accompanying drawings, wherein:—

Figure 1 is a side elevation, partly in vertical section, illustrating the improved vehicle tire; Fig. 2 is a cross sectional view thereof; and Fig. 3 is a detail elevation showing an alternative way of connecting the springs throughout the series.

Similar characters of reference designate corresponding parts throughout the several views.

The wheel proper is designated by the letter A, and is of conventional form. The improved tire is fitted upon the felly $a$ of the wheel A, and includes essentially inner and outer rims 1 and 2 respectively, and a series of springs 3 which are interposed between the rims. The rim 1 is shiftable with relation to the rim 2 and its movements are cushioned and taken up by the springs 3. The rims 1 and 2 are provided with side flanges 4 and 5 respectively, which extend toward one another. The side flanges 5 of the rim 2 are preferably of notched construction, as shown in my prior U. S. Patent No. 943,173, of December 14, 1909, in order that said rim may have easy yielding movements, and the side flanges 4 of the rim 1 may be similarly formed for the purpose of facilitating the assemblage of this latter rim upon the felly $a$. The entire construction is completed by a casing 6, which is preferably of rubber, and incloses the rims and springs above described. The curved cross section of the casing 6 is maintained by a filler ring 7, of suitable yielding material, which is fitted upon the rim 2 and is of suitable proportions for the purpose mentioned, bearing between said rim and the adjacent portion of the casing 6. The side portions of the latter are secured to the felly $a$ by transverse bolt fastenings 8, said fastenings serving also to secure wear-rings 9, which are arranged at each side of the felly and bear against the side portions of the casing 6, serving the dual purpose of holding said side portions uniformly to the felly, and of preventing said side portions from becoming torn or stripped from the bolt fastenings. When necessary, a tread strip 10, preferably of rubber, may be secured upon the casing 6, as by bolts or other suitable fastenings 11. The tread strip may be equipped with anti-skidding studs 12.

The springs 3, as a series, are disposed in the plane of the wheel, and are of new and advantageous construction. Each spring has substantially the outline of a V and includes a longer leg $3^a$ and a shorter leg $3^b$. The forward extremity of the shorter leg is joined to the corresponding extremity of the longer leg of the same spring, and the rearward extremity of such longer leg is joined to the rearward extremity of the shorter leg of the next adjacent spring. The legs $3^a$ and $3^b$ are in the nature of leaf-springs, and have a flat, transverse cross section. The joints between each pair of adjacent longer and shorter legs are shown at $3^c$, and are relatively wide and flat, having a secure frictional bearing against the rims 1 and 2 respectively. All the springs which go to make up the series may be integrally connected, as shown in Fig. 1. However, if desired, each spring may be connected to the spring at either side thereof by positive fastening means, such as rivets $3^d$, as shown in Fig. 3. It will be noted that the adjacent end portions of the legs of the springs, whereat the joints $3^c$ occur, are clenched or fashioned to bear against one another through a distance approximately the width of the springs. This arrangement not only provides a secure connection between the springs, but it also provides a joint which has an ample bearing area, and efficiently serves to receive the yielding movements of the outer rim and to transmit such movements to the body of the spring. The association of the springs 3 is such that when the outer rim and inner rim yield relatively to one another under the weight of the load, two of these springs will be practically at all times in relation to that portion of the wheel which rests upon the ground, so that the stress is transmitted to the springs in pairs as they successively enter and pass through the tractive zone. The V-shaped form of the springs is particularly efficient, in that it provides for a distribution of stress, which is most advantageously calculated to serve the purpose of the tire.

Having fully described my invention, I claim:

In a vehicle tire of the type set forth, in combination, inner and outer relatively shiftable rims and a series of V-shaped springs confined between said rims, each spring having a longer leg and a shorter leg and each leg being joined at its ends to the ends of the legs adjacent thereto, the joined ends of said legs being clenched together through a distance approximating their width and thereby having a relatively wide and flat bearing against one another and against the adjacent rims.

In testimony whereof I have hereunto set my hand in presence of two subscribing witnesses.

THEODORE H. BANKS.

Witnesses:
E. D. HENRY,
ANNIE WILLIAMS.

---

Copies of this patent may be obtained for five cents each, by addressing the "Commissioner of Patents Washington, D. C."